United States Patent [19]
Mory et al.

[11] Patent Number: 4,573,955
[45] Date of Patent: Mar. 4, 1986

[54] APPARATUS FOR STACKING THERMOPLASTIC SHEETS

[75] Inventors: Steven W. Mory, Green Bay; Ronald L. Lotto, Bonduel, both of Wis.

[73] Assignee: FMC Corporation, Chicago, Ill.

[21] Appl. No.: 539,789

[22] Filed: Oct. 7, 1983

[51] Int. Cl.[4] ........................ B31B 1/64; B31B 49/04; B65H 29/32; B65G 57/04

[52] U.S. Cl. .................................... 493/204; 271/195; 271/196; 414/72

[58] Field of Search ........................ 271/195, 196, 197; 414/72; 493/203, 204, 226

[56] References Cited

U.S. PATENT DOCUMENTS 2,769,495 11/1956 Pomper et al. ................. 271/195 X
3,971,554 7/1976 Stange ................................. 271/195
4,286,907 9/1981 Houle et al. .................... 271/196 X
4,459,172 7/1984 Achelpohl et al. ............. 493/204 X

FOREIGN PATENT DOCUMENTS 468077 11/1928 Fed. Rep. of Germany ...... 271/195

*Primary Examiner*—E. Michael Combs
*Attorney, Agent, or Firm*—Louis J. Pizzanelli; Richard B. Megley

[57] ABSTRACT

Disclosed is a method and apparatus, associated with a rotary transfer device having a plurality of radially extending circumferentially spaced arms, for flattening and maintaining thermoplastic web segments or bags in a flat condition at a pick-up or transfer station so that successive segments or bags are being engaged and transferred by the arms of the transfer device are free of folds or wrinkles and thus insure proper stacking on one or more upwardly extending posts at a stacking station.

1 Claim, 6 Drawing Figures

FIG_3
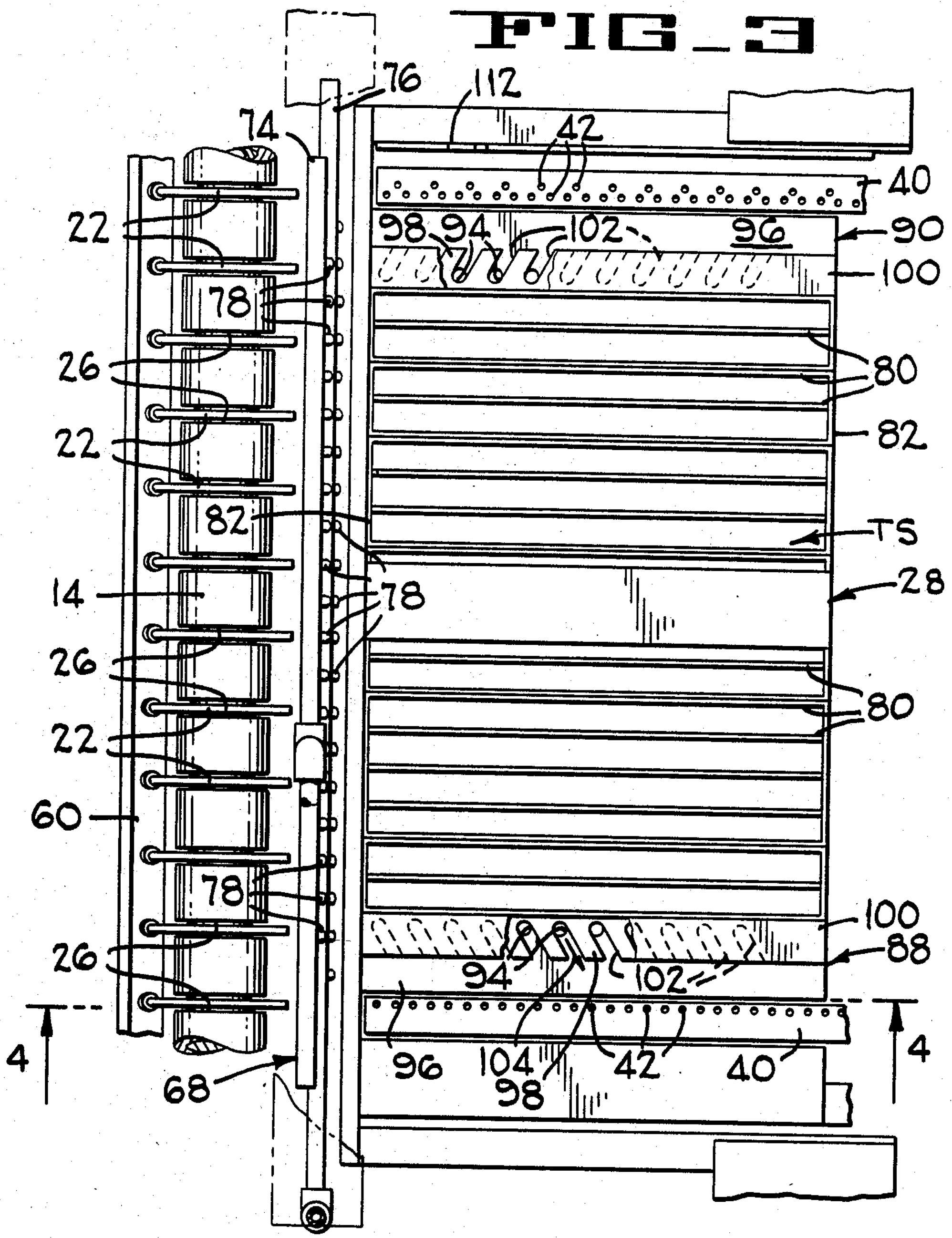
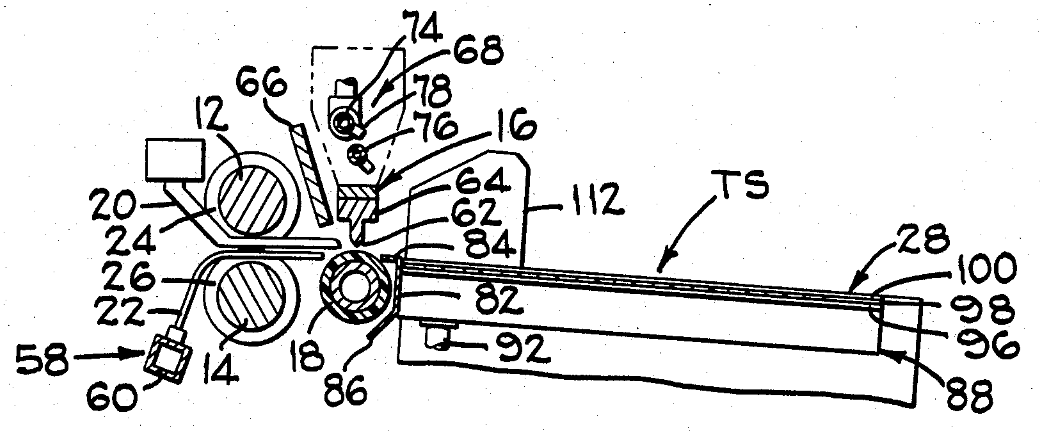
FIG_4

APPARATUS FOR STACKING THERMOPLASTIC SHEETS

This invention relates to stacking of bags and more particularly to thermoplastic bags or web segments that may be further processed to produce bags while in a stacked configuration.

Prior patents related to the subject matter of this disclosure are U.S. Pat. Nos. 4,286,907 and 4,260,147 to Philip J. Hole, and U.S. Pat. No. 3,805,683 to Corry T. Hook.

The primary objective of the invention is to create air flow patterns that establish differential pressure to ensure that a segment of thermoplastic web deployed at a transfer station assumes a planar condition to effect proper registration with one or more stacking posts positioned at a stacking station. When producing bags with one panel extending beyond the other panel viz, uneven edge bags, the extending portion, usually referred to as a lip, is provided with two holes being spaced in conformance with a pair of upwardly projecting wicket pins or receiving posts positioned at a stacking station. Failure to ensure a flat or planar condition of the bag before it is engaged by the transfer arms of the transfer mechanism, particularly the lip, causes displacement of one or both holes in the lip resulting in missing one or more stacking posts. In the art this condition is sometimes referred to as "one holers".

Figures 1, 2:
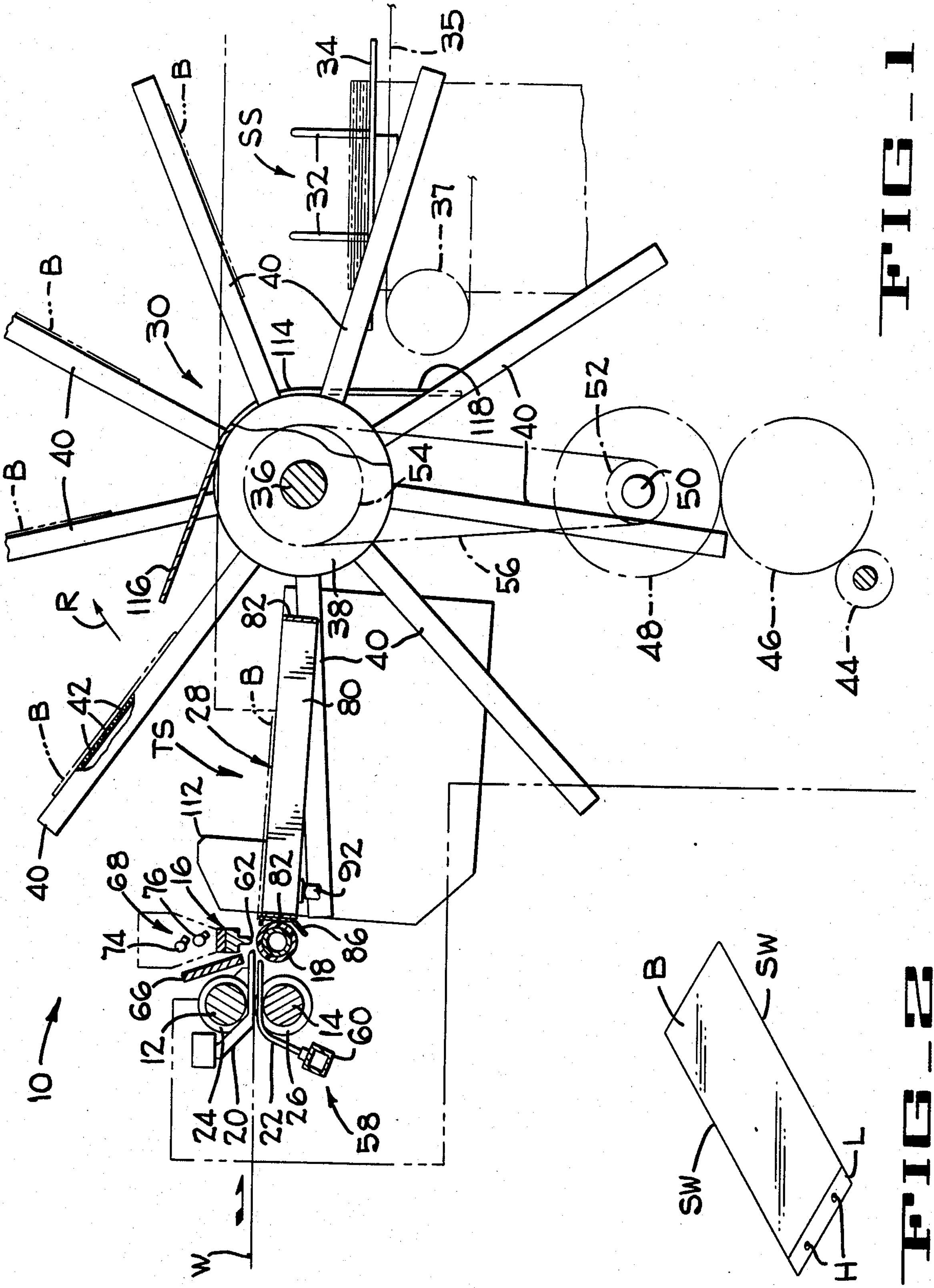
Figures 5, 6:
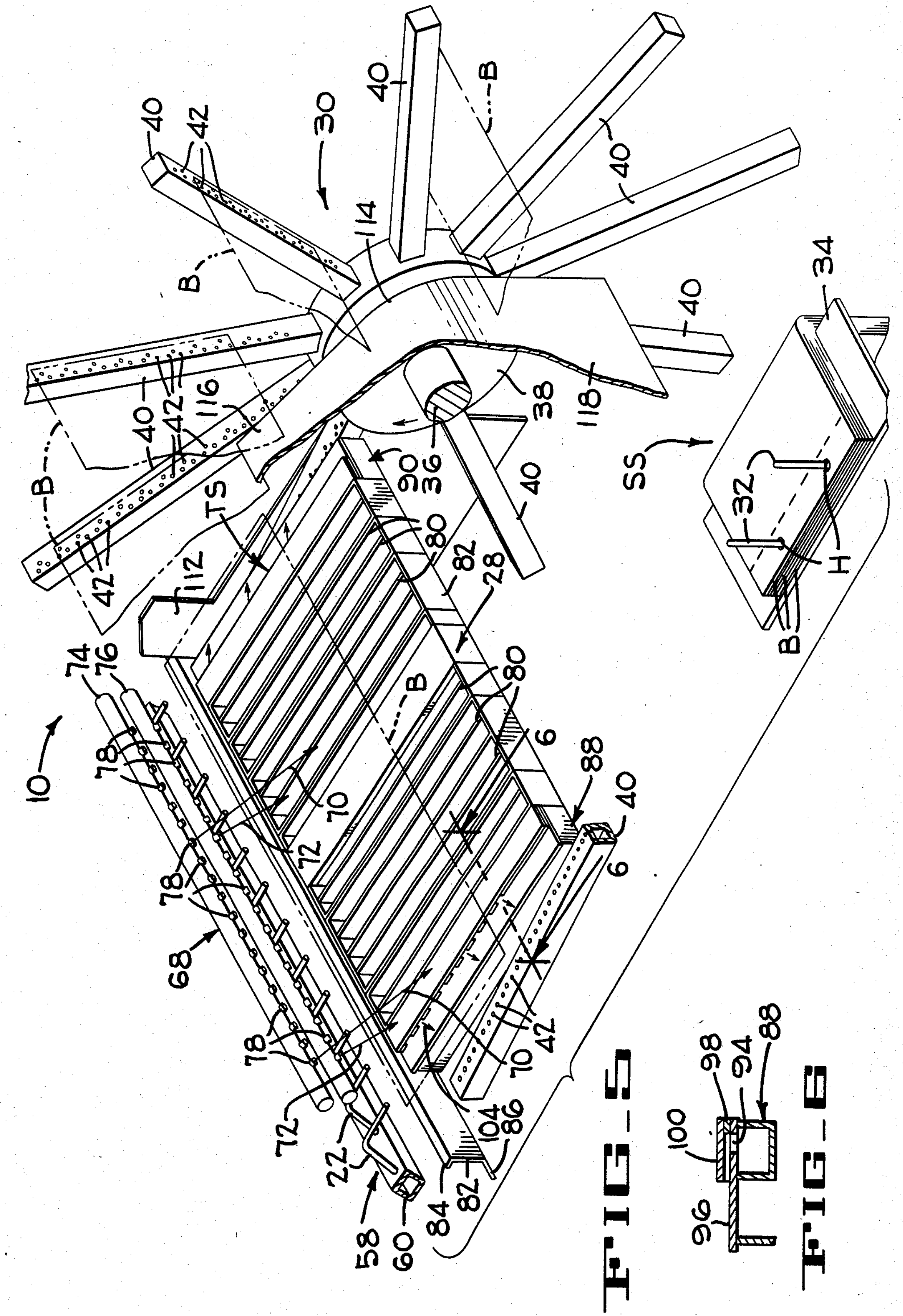

FIG. 1 is an elevation illustrating the draw rolls, the sealing and severing station, the transfer station, the transfer mechanism and the stacking station of a typical bag machine, FIG. 2 is a perspective of a typical lipped bag, FIG. 3 is a partial plan of FIG. 1 illustrating certain details of the stacking station, FIG. 4 is a cross section of FIG. 3 taken substantially along the line 4—4, FIG. 5 is a diagrammatic perspective of FIG. 1, and FIG. 6 is a section taken along the line 6—6 of FIG. 5.

A transfer station and transfer mechanism incorporating the preferred construction fulfilling the mode of operation of the present invention, is shown in FIG. 1 and is generally identified by the numeral 10. Thermoplastic web material W being folded along a line spaced from its longitudinal median to produce uneven edges is passed between upper and lower draw rolls 12 and 14 respectively, which are in forceable contact creating nip pressure to feed the web material in the direction indicated by the arrow. Longitudinally adjacent to the draw rolls a reciprocating seal bar 16, cooperates with a platen or seal roll 18 to sever and seal a portion of web material which is projected between the seal bar and the platen roll when the seal bar is in its raised position. Associated with the draw rolls and serving to ensure that the web follows a linear path are upper and lower stripper fingers 20 and 22 residing in slots or undercuts 24 and 26 formed at equally spaced intervals in each of the draw rolls (FIG. 3).

Adjacent to the seal roll 18 a slightly downwardly inclined grid-like support or table 28 is provided for supporting an advanced portion of the web which will constitute a bag B created when the seal bar 16 moves downwardly in pressure engagement with the platen or seal roll 18. FIG. 2 depicts a completed bag which includes side welds SW, a lip L and 2 wicket pin receiving holes H. A bag on the table or support 28 is transferred by transfer mechanism 30 in a circular arc to a stacking stacking station SS which includes upwardly projecting pins or posts 32 rigidly connected to a supporting plate 34. The supporting plates 34 are attached to a chain conveyor 35 wrapped around a sprocket 37. The conveyor 35 carries a plurality of plates 34 and a drive advances the upper reach of the conveyor to the right (FIG. 1) moving a plate carrying a complete bag stack away from stacking station SS and positioning a successive plate at the stacking station so that another bag stack can be produced. It will be observed that the stacking station illustrates a bag stack being generated on the posts 32.

The transfer mechanism 30 whose construction and mode operation is conventional in the art will be briefly described to integrate its operation with the present disclosure. Essentially, the transfer mechanism comprises a transverse support shaft 36 mounting at each end enlarged hollow hubs 38 being connected to a source of vacuum. Each hub has rigidly connected to its outer circular periphery a series radially extending equally circumferentially spaced hollow bars 40 provided, on a selected surface, with a series of holes 42 extending for substantially the entire length of the surface. As shown in FIG. 3 the surface of the bars 40, having the holes 42 form therein are the leading surfaces with respect to the clockwise rotation indicated by the arrow R in FIG. 1 so that in passing the surface of the table 28 the bag lying thereon is grasped or held firmly due to the blockage of selected holes 42 and the attendant pressure difference resulting therefrom.

The rate at which successive bags are deployed on the support table 28 is equal to the rate at which successive pairs of arms approach, engage and transfer a bag from the transfer station TS to the stacking station SS. FIGS. 1 and 5 show a bag carried by each pair of arms as they recede from the transfer station TS and approach the stacking station SS.

Synchronized rotation of the transfer mechanism 30 is achieved by connecting its drive to the drive of the bag machine. Portions of the drive is shown in FIG. 1 where a pinion gear 44 drives, through an idler gear 46, a large gear 48 mounted on a shaft 50, a gear pulley 52 driving a gear pulley 54 fixed to the shaft 36 by cogbelt 56.

In accordance with the primary objective of this invention means are provided for maintaining the portion of the web W advanced to the table 28 in a flat wrinkle-free condition during its advance and during the time of its momentary repose on the table 28 to insure that its flat condition is maintained when the completed bag B is gripped by a pair of arms 40 of the transfer device 30. Such means comprise cyclically operable means 58, including lower stripper fingers 22, for creating a curtain of high velocity air below the path of the web W to establish 2 principal concurrent conditions: (1) reduce the static pressure between the web W and the table 28 and (2) to "stiffen" the advancing web portion to prevent or remove wrinkles that may develop. The first of said conditions creates a differential static pressure between the upper and lower surfaces of the web and thereby establishes a net force tending to urge the advancing web portion toward the table 28 while at the same time stiffening occurs by virtue of a plurality of spaced apart high velocity air streams tending to corrugate and thus stiffen the advancing web segment.

Each of the lower stripper fingers 22 are in the form of a tubular conduit having a slight arcuate bend as illustrated. One end of the fingers are connected to transversely extending air supply manifold 60 which is supported in any suitable manner to the frame of the machine. As indicated previously air is admitted to the manifold 60 during a portion of every machine cycle by machine timed valves which are conventional in the art. The preferred sequence of operation of admitting or connecting the manifold 60 to the supply of pressure air is initiated when the leading edge of the web being advanced to the support table 28 is at least 1¼ inches beyond the edge of the table adjacent to the platen or seal roll 18 and is terminated when the tip 62 of a heated seal bar 64 is just above the lower end of a liquid cooled heat shield 66.

In addition to the curtain of air supplied by the stripper fingers 22 streams of high velocity air issuing from depressing or air blow down means 68 producing high velocity air blankets impinging the advancing portion of the web at longitudinally spaced intervals. A descriptive illustration of this condition is shown in FIG. 5 by the pairs of vectors 70 and 72. As illustrated the vectors 70 impinge on the bag or web segment toward its leading edge while the vectors 72 impinge upon the bag near the trailing seal.

The air blow down means comprise an upper and lower manifold 74 and 76, respectively, and each of the manifolds carries a plurality of regularly laterally spaced nozzles 78.

As shown most clearly in FIG. 5 the support of table 28 is built up from a plurality of longitudinally extending metal strips 80 having their ends joined to transversely extending strips 82. As illustrated in FIG. 4 the strip 82 adjacent the platen or seal roll 18 is formed with a substantially 90° flange 84 defining an extension of the upper surface of table 28 and a lower oblique flange 86. The metal strip 82 formed as described serves to prevent the creation of misdirected air currents which may interfere with maintaining the flatness of the bag B.

While the air currents issuing from the manifolds 74 and 76 and from the lower stripper fingers 22 maintain a major portion of the bag substantially flat, means are provided for ensuring flatness of the ends of the bag which define the bottom and the mouth. To achieve and maintain flatness the opposed longitudinal ends of the table 28 are provided with extensions 88 and 90 each of which define a chamber connected to a source of pressure air by conduits 92 one of which is shown in FIG. 4. Each chamber is formed with a plurality of holes 94 through which air is discharged. FIG. 6 shows the details of construction of the chamber 88 which takes the form of a generally rectangular housing having the holes 94 in its upper partition 96 which is extended to provide support for the opposed end portions of a bag and to direct air issuing from the holes 94. Overlying the upper partition 96 are two flat strips of metal or other suitable material 98 and 100. Reference to FIG. 3 will illustrate that the strip 98 is formed with a plurality of slots 102 directed in a generally oblique direction as indicated by the arrow 104 and providing a channel for the air issuing from the holes 94. The strip 100 is secured to the slotted strip 98 and thereby defines a passageway directing the air discharged through the holes 94 substantially in the direction indicated by the arrow 104. Moreover, the strip 100 provides a smooth upper surface coplanar with the upper surface of the metal strips 80 insuring that no hinderance is encountered by the thermoplastic web when it is projected on the table 28 by the draw rolls 12 and 26.

As shown in FIG. 5 the top and bottom of a bag deployed on the table 28 not only overlies the chambers 88 and 90 but extend slightly beyond the upper partitions 96 sufficiently to be engaged by the hollow bars 40 of the transfer mechanism 30. High velocity air issuing from the slots 102 and directed in the direction indicated by the arrows 104 not only create a drop in static pressure below that of ambient conditions and thereby retain the bag in the illustrated position but also have the tendency to dissipate irregularities (creases, waviness, etc.) in the ends of the bag which will be engaged by the bars 40. This of course ensures that on being grasped by the bars 40 the bag will assume a substantially planar condition.

To achieve the objective of insuring that each bag is retained by each stacking post 32 it is essential that the bag lip overlying the chamber 88 is flat and smooth. Contributing to the attainment of this condition an air shield 112, taking the form of a flat plate of metal or plastic, is mounted to lie in a vertical plane adjacent the path of the bars 40 that engage the bag lip L. The plate 112 controls the air currents such that the lip L of the bag is maintained sufficiently flat to achieve proper pickup by the transfer arms 40.

Air discharged by the lower stripper fingers 22 and the nozzles 78 attached to the manifolds 74 and 76 produce currents of air which may disturb a bag in transit from the transfer station TS to the stacking station SS. To avoid any disturbance of the bag before it is deposited on the post 32, a stationary air baffel 114 extends between the hubs 38 and is formed with an arcuate bent portion producing an upwardly inclined panel 116 and a downwardly extending panel 118. By virtue its location and its configuration the baffel 114 directs currents of high velocity air issuing from the nozzles 78 and from the lower stripper fingers 22 downwardly not only blocking air currents that may disturb bags which are in the process of being transferred, but also the bags which are stacked on a pins 32.

According to the above description, it should be evident that providing a combination of air streams to the upper and lower surface of its own plastic bag, it assumes a generally wrinkle free flat condition which enhances proper pickup by the transfer mechanism 30 and thereby depositing the completed bag properly on both posts 32 at the stacking station.

What is claimed is:

1. In an apparatus for processing thermoplastic web intermittently unwound from a web roll and provided with means for making equally spaced pairs of holes adjacent one edge of the web and means for sealing and severing equal increments of the web along a line transverse to the direction of web advance to thereby produce web segments of equal dimensions and each of which contain a pair of holes, said apparatus further including means for supporting the leading advanced web increment before and following severance, means for transferring and stacking the segment on pins projecting through the pair of holes;

the improvement in said apparatus comprising means operable during advance of the web for directing high velocity air streams in the direction of web advance and between the path of the web and said supporting means, and means for directing high velocity air streams derived from nozzles located below and adjacent the ends of the web segment parallel to the direction of web advance, said air streams having the combined effect to remove waviness or wrinkles from the web segment while it is deployed on the supporting means, means for directing high velocity air streams derived from a plurality of nozzles located above the path of the web and impinging the web at longitudinally spaced zones, said transfer means includes a pair of transfer arm assemblies mounted on opposite ends of a transverse support shaft, each of said transverse arm assemblies including a plurality of radially extending circumferentially spaced hollow arms provided with holes communicating with a source of vacuum, means for rotating said arms in synchronism with the intermittent advance of the web with said arms describing paths straddling the supporting means to grasp successive web segments and transport the segment held thereby in a circular arc onto the pins, and means positioned between said transfer arm assemblies and adjacent said support shaft at a position spaced longitudinally downstream from the supporting means and said support shaft for deflecting the air currents created by said airstreams downwardly from the path in which the segments are transferred and placed on the pins.

* * * * *